United States Patent [19]
Klein

[11] Patent Number: 6,044,427
[45] Date of Patent: Mar. 28, 2000

[54] UPGRADABLE MOBILE PROCESSOR MODULE AND METHOD FOR IMPLEMENTING SAME

[75] Inventor: Dean A. Klein, Eagle, Id.

[73] Assignee: Micron Electronics, Inc., Nampa, Id.

[21] Appl. No.: 09/015,866

[22] Filed: Jan. 29, 1998

[51] Int. Cl.[7] .............................. G06F 13/40; G06F 13/38
[52] U.S. Cl. ......................... 710/127; 710/62; 710/129; 710/128
[58] Field of Search .............................. 710/52, 72, 100, 710/107, 126, 127, 39, 15, 62, 128, 129, 131, 106, 8, 17; 711/122, 202, 118; 439/660, 736; 712/33, 1, 28, 29, 215, 37; 395/500.11, 500.48, 500.1, 500.46, 500.08; 713/501; 714/44; 345/583, 501, 520; 709/301

[56] References Cited

U.S. PATENT DOCUMENTS 5,675,772  10/1997  Liu et al. ........................... 315/500.48
5,772,474  6/1998  Yagi et al. .............................. 439/660
5,802,269  9/1998  Poisner et al. ............................ 714/64
5,857,086  1/1999  Horan et al. ............................ 710/129

*Primary Examiner*—Daniel H. Pan
*Attorney, Agent, or Firm*—Dorsey & Whitney LLP

[57] ABSTRACT

A method for preparing an upgradable Pentium-based mobile processor module that is forward-compatible with an enhanced Pentium II-based mobile processor module. The upgradable Pentium-based mobile processor module uses 0.5 millimeter pitch connection technology and contains a system controller that supports a single peripheral component interconnect port. The upgradable Pentium-based mobile processor module provides a PCI port for connection to a PCI bus and an AGP port for connection to an AGP bus. The AGP port is electronically connected to the PCI port so that both the AGP port and the PCI port receive data and control signals from the system controller according to the PCI protocol standard.

16 Claims, 4 Drawing Sheets

UPGRADABLE MOBILE PROCESSOR MODULE AND METHOD FOR IMPLEMENTING SAME

TECHNICAL FIELD

The present invention relates to electronic modules and, in particular, to upgradable electronic modules that are forward compatible with future electronic modules having enhanced components and enhanced connectivity.

BACKGROUND OF THE INVENTION

A mobile processor module ("MPM") is a multi-component device that plugs into a PC motherboard. Conventional MPMs contain a voltage regulator, a central processing unit ("CPU"), a cache, and a system controller. FIG. 1 shows an architecture block diagram of an MPM produced by the Intel Corporation. This MPM 101 contains a Pentium® processor 102, a L2 cache SRAM 103, a tag RAM 104, a voltage regulator 105, and a MCTX "North Bridge" system controller 106. This MPM interfaces to DRAM memory 107 via a memory bus 108 and to other devices within the PC system via a port 114 to PCI bus 109. An internal CPU bus 113 connects the CPU 102, cache SRAM 103, and system controller 106. Other devices coupled to the PCI bus 113 may include a PCI-ISA bridge 110, a video graphics accelerator ("VGA") controller 111, and other PCI-compatible system components 112. The PCI bus 109 in current systems generally runs at a clock speed of 33 MHz. The structure and operation of the above-described components are conventional. Therefore, an explanation of their structure and operation will be omitted in the interest of brevity.

VGA controllers are currently available that can run either at a clock speed of 33 MHz or a clock speed of 66 MHz. Increased clock speeds for VGA controllers result in increased rate of data transfer from a MPM 101 to a VGA display monitor controlled by the faster VGA controller 111. Increased data transfer rates are important for enhanced multimedia computer applications and graphical user interfaces that display detailed animation and real-time video images.

In order to take a better advantage of VGA controllers that run at higher clock speeds, as well as to take advantage of the increased performance and capabilities of the Pentium® II processor, Intel may produce an enhanced MPM that will be herein referred to as a model MDM-A MPM. FIG. 2 shows an architecture block diagram of the Intel MDM-A enhanced MPM. Many of the components shown in FIG. 2 are identical to components shown in FIG. 1. Thus, in the interest of brevity, these components of FIG. 2 that are identical to components in FIG. 1 have been provided with the same reference numerals as in FIG. 1, and an explanation of their operation will not be repeated. The MDM-A 201 contains a cache SRAM 202, a Pentium® II CPU 203, a voltage regulator 204, and an Intel 440 BX "North Bridge" system controller 205. The system controller 205 is connected to DRAM memory 107 via a memory bus 108. The system controller 205 has two ports 213 and 214 for coupling to external devices. As in the MPM 101 shown in FIG. 1, most PCI-compatible devices 112 and a PCI-ISA bridge 110 are connected to the system controller 205 via a PCI bus 109. This PCI bus 109 runs at 33 MHz. Unlike the MPM 101 shown in FIG. 1, the MDM-A system controller 205 has a second port 214 coupled to an advanced graphics processor ("AGP") bus 211 that connects the system controller 205 to the VGA controller 111. The AGP bus 211 employs a data transfer protocol that is a superset of the PCI bus protocol. The AGP bus 211 runs at a clock speed of 66 MHz. The MDM-A 201 is thus able to take advantage of the higher clock rates of 66 MHz VGA controllers and includes the faster and more capable Pentium® II CPU.

The currently-available Intel MPM 101 shown in FIG. 1 is connected to the system with a 0.8 millimeter pitch connector. The MDM-A 201 will be connected to systems with a 0.5 millimeter pitch connector which increases the number of available connector pins in order to accommodate a second port 215 from the MPM-A 201 to the AGP bus 211.

Personal computer ("PC") manufacturers prefer to develop upgradable PCs that can accommodate new, enhanced components when these components become available. Although the MDM-A device 201 is not currently available, it is desirable for PC manufacturers to produce a PC incorporating the currently-available MPM 101 shown in FIG. 1 that can be, in the future, upgraded by replacing the MPM 101 with an MDM-A 201 shown in FIG. 2. However, because the MDM-A 201 includes additional pins for the second AGP port 215, and because the VGA controller 111 is connected via the AGP bus 211 rather than via the PCI bus 109, the PC system shown in FIG. 1 is not compatible with the MDM-A 201 shown in FIG. 2. A need has therefore been recognized for an upgradable MPM that incorporates the components of the MPM 101 shown in FIG. 1, but is compatible with, and can be replaced by, the MDM-A 201 shown in FIG. 2.

SUMMARY OF THE INVENTION

The present invention provides an upgradable Pentium® based MPM that is forward-compatible with an enhanced Pentium® II-based MPM that uses 0.5 millimeter pitch connection technology and that has both a PCI port for connection to a PCI bus and an AGP port for connection to an AGP bus. The upgradable Pentium®-based MPM uses 0.5 millimeter pitch connection technology and contains a system controller that supports a single PCI port. The upgradable Pentium®-based MPM provides a PCI port for connection to a PCI bus and an AGP port for connection to an AGP bus. The AGP port is electronically connected to the PCI port so that both the AGP port and the PCI port receive data and control signals from the system controller according to the PCI protocol standard.

DETAILED DESCRIPTION OF THE INVENTION

Figure 1:
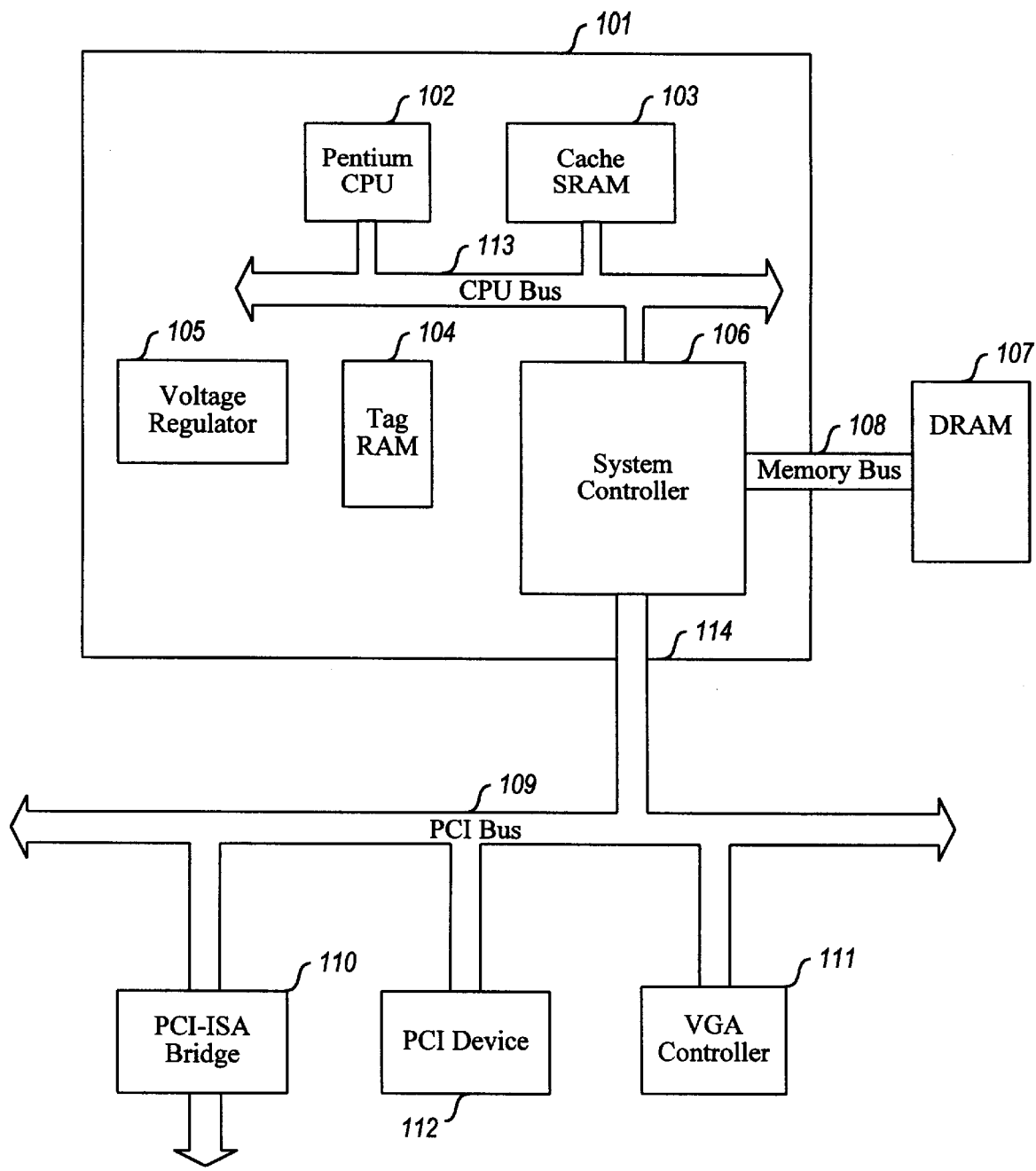
FIG. 1 is an architecture block diagram of an MPM produced by the Intel Corporation.

The present invention provides an upgradable MPM for use in a PC designed to be forward-compatible with the planned MDM-A MPM. Intel's currently-available MPM 101 shown in FIG. 1 contains sufficient connection pins for a single PCI port 114 from the MPM 101 to the PCI bus 109 through which the MPM 101 exchanges data and control sequences with other PCI-compatible devices. The planned MDM-A 201 shown in FIG. 2 contains additional pin connectors that allow the MDM-A 201 to connect both to a PCI bus 109, as well as to an AGP bus 211. The AGP bus 211 runs at a higher clock rate and is used to connect the system controller 205 with a VGA controller 111. As explained further below, an upgradable MPM that represents one embodiment of the current invention includes the components incorporated into the currently-available Intel MPM 101, but is connection-compatible with the planned MDM-A 201. This upgradable MPM can be used to build PCs that are forward-compatible with the planned MDM-A 201. In order to be plug compatible with future MPM devices, the upgradable MPM that represents one embodiment of the current invention includes additional pin connectors to support the AGP port and connects those pin connectors to the PCI port. Thus, in the upgradable MPM device, the system controller outputs PCI protocol to both the PCI port and to the AGP port.

Figure 2:
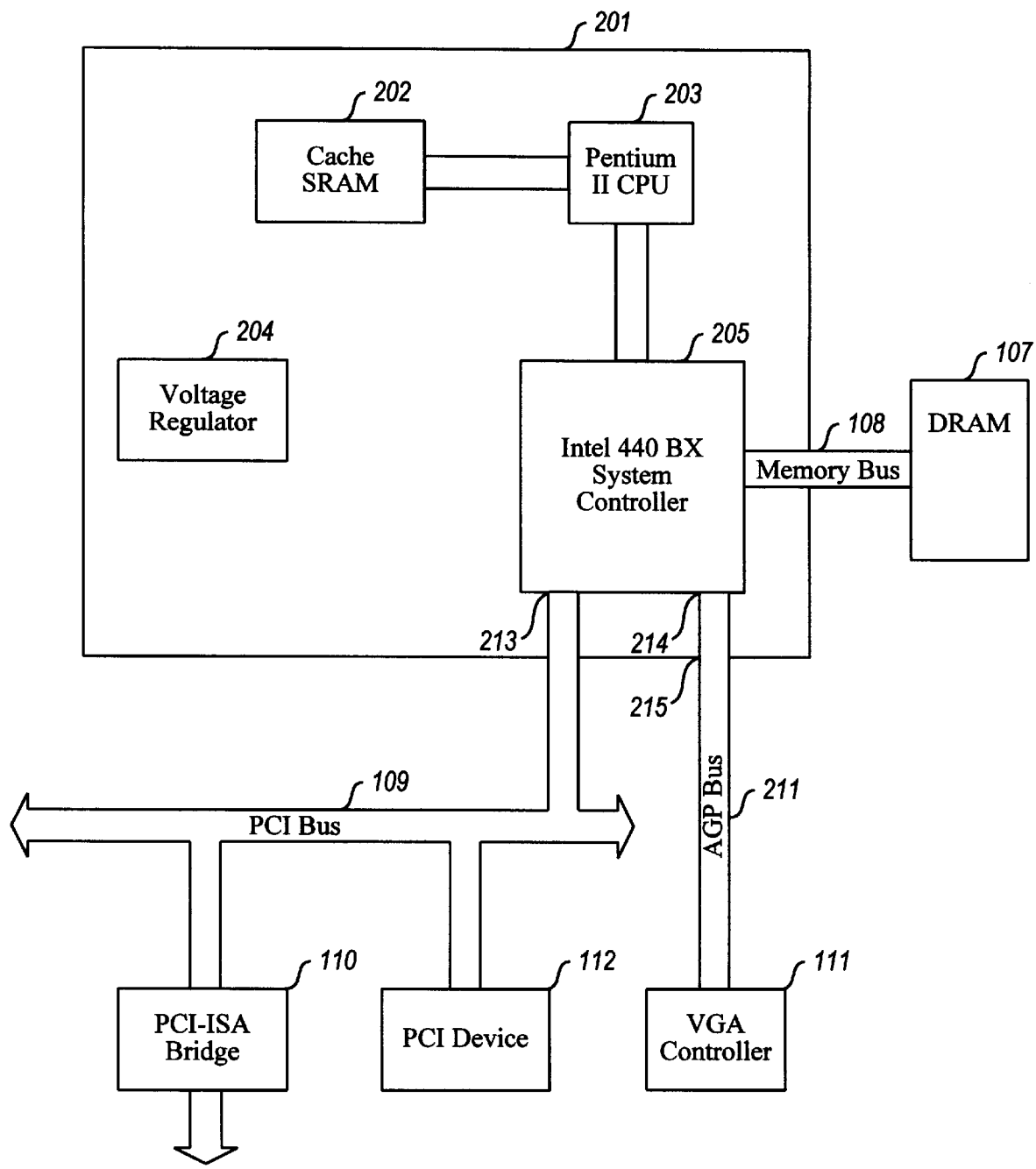
FIG. 2 is an architecture block diagram of the planned Intel MDM-A enhanced MPM.
Figure 3:
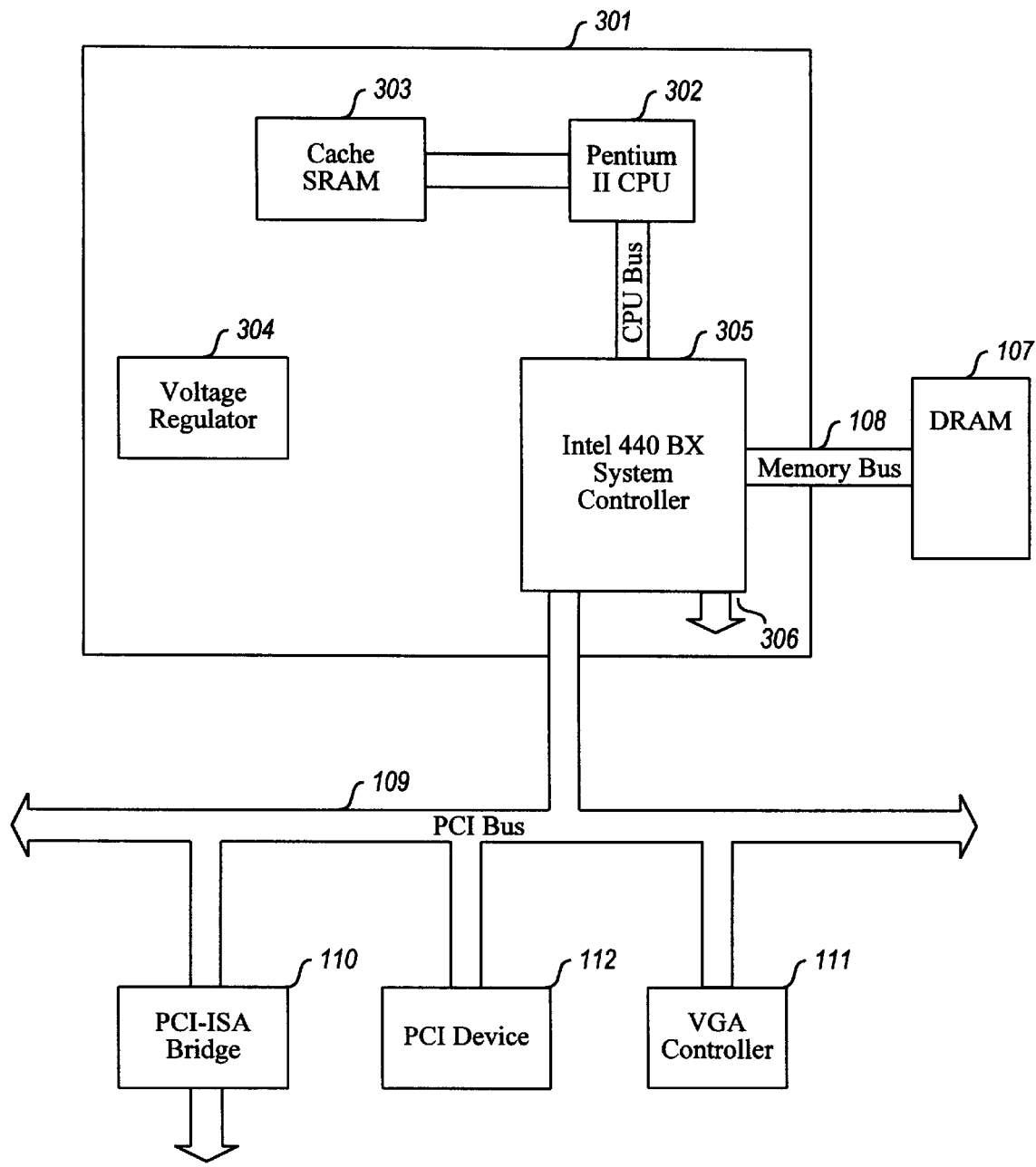
FIG. 3 is an architecture block diagram of a backward-compatible Pentium® II-based MPM.

It is relatively easy to develop a backward-compatible MPM that includes the internal components planned for use in the MDM-A 201. FIG. 3 is an architecture block diagram of a backward-compatible Pentium® II-based MPM. Many of the components shown in FIG. 3 are identical to components shown in FIG. 1. In the interest of brevity, those components of FIG. 2 that are identical to components in FIG. 1 have been provided with the same reference numerals as in FIG. 1, and an explanation of their operation will not be repeated. The backward-compatible MPM 301, like the MDM-A 201, includes a Pentium® II CPU 302, cache SRAM 303, voltage regulator 304, and an Intel 440BX system controller 305. An AGP port 306 of the system controller 305 is simply terminated on the board. As in the system architecture used for the currently-available MPM 101 shown in FIG. 1, the backward-compatible MPM 301 connects to external devices solely through the PCI bus 109. Thus, the system can take advantage of the increased processor performance of the Pentium® II CPU, but cannot take advantage of the potentially increased clock speeds that can be achieved by connecting the VGA controller 111 through the AGP port 214 that is available on the Intel 440BX system controller 205. Instead, the VGA controller 111, like the remaining PCI-compliant devices, exchanges data and control information with the system controller over the PCI bus 109. The backward-compatible MPM 301 shown in FIG. 3 can be used to upgrade older systems having the architecture displayed in FIG. 1, but cannot be used in systems built to be compatible with the MDM-A 201 shown in FIG. 2 because the backward-compatible MPM lacks the AGP bus pin connections and the 0.5 millimeter pitch connector planned for the MDM-A 201. Thus, using the backward-compatible MPM 301, an older Pentium®-based system can be upgraded to a Pentium® II CPU, but cannot take advantage of increased VGA bandwidth.

Figure 4:
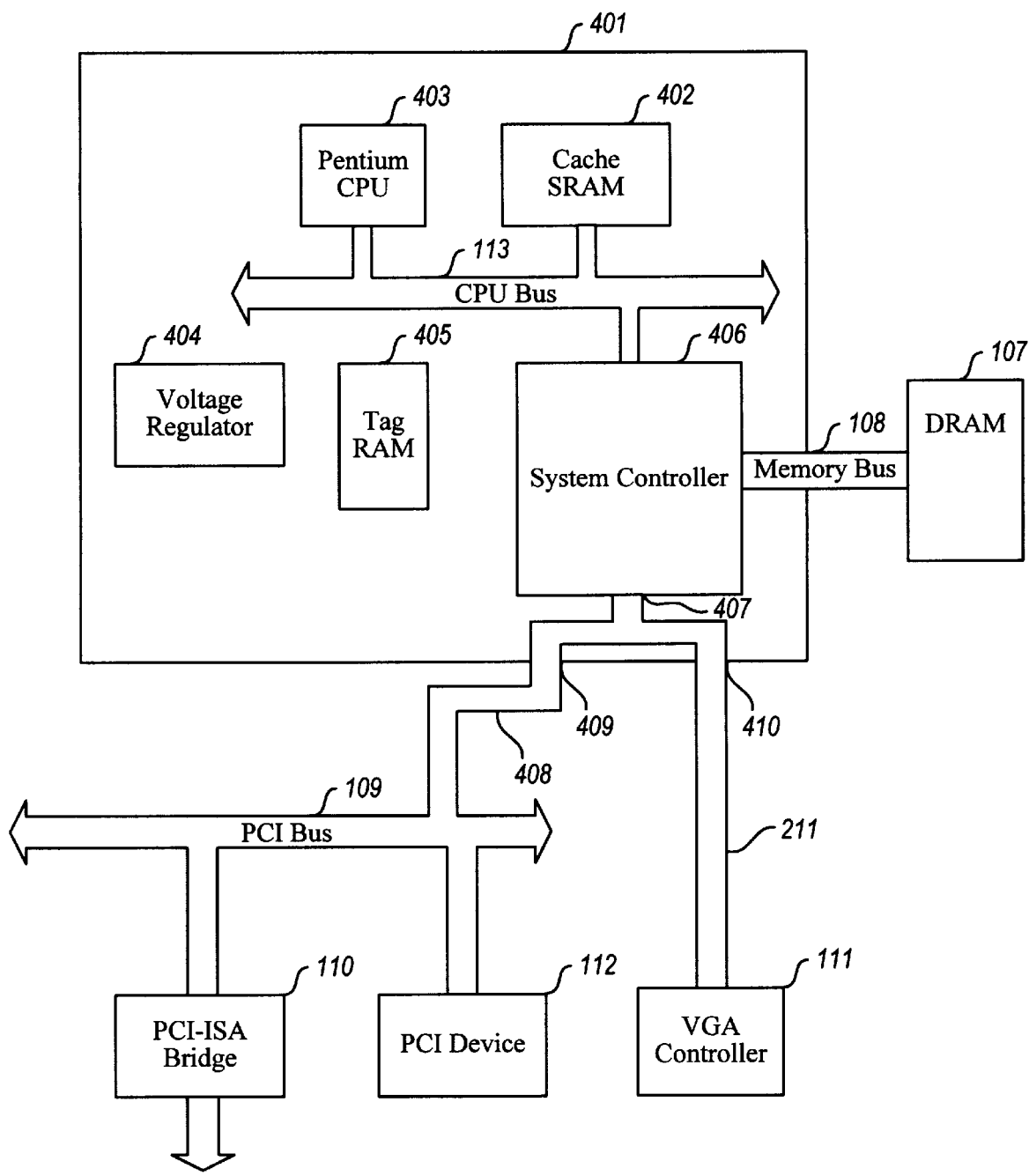
FIG. 4 is an architecture block diagram of a forward-compatible MPM device that incorporates components of the currently-available MPM displayed in FIG. 1.

FIG. 4 is an architecture block diagram of a forward-compatible MPM 401 that incorporates components of the currently-available MPM 101 shown in FIG. 1. As in the currently-available MPM 101, the forward-compatible MPM 401 includes a cache SRAM 402, a Pentium® CPU 403, a voltage regulator 404, a tag RAM 405, and a MCTX "North Bridge" system controller 406. As discussed above, this system controller 406 has a single PCI port 407 for connection to external devices through the PCI bus 109. However, in the forward-compatible, or upgradable, MPM 401, 0.5 millimeter pitch connection technology is employed that allows for pin connections for both the PCI bus 109 as well as for an AGP port 410. Thus, the upgradable MPM 401 is plug compatible with the MDM-A 201 in PCs designed for a separate AGP bus 211 connection between a VGA controller 111 and the system controller 406 on the MPM 401. The system controller 406 of the upgradable MPM 401 is, like the system controller 106 of the current MPM 101 shown in FIG. 1, connected through a single PCI port 407 to all of the PCI-compatible external devices 112, including the VGA controller 111. Because the AGP bus protocol is a superset of the PCI bus protocol, the system controller can exchange data using the PCI protocol with the VGA controller 111 at 33 MHz.

The AGP port 410 includes additional control lines that are not present on a PCI port. Pin connectors for those additional control lines are included in the upgradable MPM 401, but the AGP sideband signal will have no destination on the upgradable MPM 401. The sideband signals may be terminated on the upgradable MPM 401 to prevent floating conditions, or they may be coupled through resistors on the motherboard to an inactive logic level.

Although the present invention has been described in terms of one embodiment, it is not intended that the invention be limited to this embodiment. Modifications within the spirit of the invention will be apparent to those skilled in the art. For example, a variety of different controllers and devices can be employed as components both of the MPM devices and the external devices on the PC motherboard. The AGP bus may be run up to clock speeds of 133 MHz, and thus future systems with enhanced VGA controllers may achieve even higher video data transmission bandwidths. Forward compatibility may be accomplished, by similar techniques, for other planned future enhancements to MPM device connectivity and component technologies. The scope of the present invention is defined by the claims that follow.

I claim:

1. A method for implementing an upgradable electronic module to be forward compatible with an enhanced electronic module, the upgradable electronic module incorporating internal components that have first-level capabilities and that support a first number of external connections provided to other electronic devices by the upgradable electronic module, the upgradable electronic module providing an external connection to a first-level bus connected to the single port of the internal component, the upgradable electronic module also providing an external connection to a second-level bus, the enhanced electronic module incorporating at least one enhanced internal component that has a second-level capability and that supports a second number of external connections provided to additional electronic devices by the enhanced electronic module, the method comprising:

incorporating internal components having first-level capabilities into the upgradable electronic module, including incorporating into the upgradable electronic module an internal component having a single port to a first-level bus;

connecting any of the first and second number of external connections provided by the upgradable electronic module that are not supported by the internal components of the upgradable electronic module to the first and second number of external connections of the upgradable electronic module that are supported by the internal components of the upgradable electronic module;

connecting the external connection to the second-level bus to the single port of the internal component because the internal component lacks a second port to the second-level bus controller; and incorporating a system controller having one peripheral component interconnect port into the upgradable electronic module, the upgradable electronic module providing an external connection to a peripheral component interconnect bus connected to a peripheral component interconnect port of the system controller, the upgradable electronic module also providing an external connection to an accelerated graphics processor bus, the method further including connecting the external connection of the accelerated graphics processor bus to the peripheral component interconnect port of the system controller.

2. The method of claim 1 further including incorporating a first-level processor into the upgradable electronic module, wherein the enhanced electronic module includes a second-level processor.

3. The of claim 1 further including incorporating a Pentium processor into the upgradable electronic module, wherein the enhanced electronic module includes a Pentium II processor.

4. The method of claim 1 further including incorporating a Pentium processor into the upgradable electronic module and using 0.5 millimeter pitch connection technology, wherein the enhanced electronic module includes a Pentium II processor and uses 0.5 millimeter pitch connection technology.

5. A method for implementing an upgradable mobile processor module to be forward-compatible with an enhanced mobile processor module, the upgradable mobile processor module having a central processor unit that runs at a first speed, the enhanced mobile processor module having a central processing unit that runs at a second, faster speed and having both a peripheral component interconnect port for connection to a peripheral component interconnect bus and an accelerated graphics processor port for connection to an accelerated graphics processor bus, the method comprising:

incorporating into the upgradable mobile processor module a system controller having a first port adapted to support a single peripheral component interconnect port;

incorporating into the upgradable mobile processor module a peripheral component interconnect port for connection to a peripheral component interconnect bus and configured to be electrically compatible with a device coupled to the peripheral component interconnect bus;

incorporating into the upgradable mobile processor module an accelerated graphics processor port for connection to an accelerated graphics processor bus and configured to be electrically compatible with a device coupled to the accelerated graphics processor bus; and coupling the first port of the system controller to both the accelerated graphics processor port and the peripheral component interconnect port so that both the accelerated graphics processor port and the peripheral component interconnect port receive data and control signals from the system controller according to a peripheral component interconnect protocol standard.

6. The method of claim 5 further including incorporating a Pentium processor into the upgradable mobile processor module, wherein the enhanced mobile processor module includes a Pentium II processor.

7. The method of claim 5 wherein the peripheral component interconnect port is intended to connect the system controller to various external devices via the peripheral component interconnect bus and the accelerated graphics processor port is intended to connect the system controller to a VGA controller.

8. The method of claim 7 wherein the various external devices intended to be connected to the system controller via the peripheral component interconnect bus run at a clock speed of 33 megahertz and the VGA controller intended to be connected to the system controller via the accelerated graphics processor port runs selectively at either one of a clock speed of 33 megahertz and a clock speed of 66 megahertz.

9. A method for implementing an upgradable Pentium-based mobile processor module to be forward-compatible with an enhanced Pentium II-based mobile processor module that uses 0.5 millimeter pitch connection technology and that has both a peripheral component interconnect port for connection to a peripheral component interconnect bus and an accelerated graphics processor port for connection to an accelerated graphics processor bus, the method comprising:

constructing a Pentium-based mobile processor module that uses 0.5 millimeter pitch connection technology and that contains a system controller that supports a single peripheral component interconnect port;

incorporating into the Pentium-based mobile processor module a peripheral component interconnect port for connection to a peripheral component interconnect bus and electrically compatible with a device coupled to the peripheral component interconnect bus;

incorporating into the Pentium-based mobile processor module an accelerated graphics processor port for connection to an accelerated graphics processor bus and electrically compatible with a device coupled to the accelerated graphics processor bus; and electronically connecting the accelerated graphics processor port and the peripheral component interconnect port to the system controller peripheral component interconnect port so that both the accelerated graphics processor port and the peripheral component interconnect port receive data and control signals from the system controller according to a peripheral component interconnect protocol standard.

10. The method of claim 9 including incorporating into the upgradable Pentium-based mobile processor module a MCTX North Bridge system controller.

11. A method for implementing a computer system that contains an upgradable electronic module to be upgradable by replacing the upgradable electronic module with an enhanced electronic module, the upgradable electronic module incorporating an internal component that has first-level capabilities and that supports a first type of external connection for a first type of electronic device by the upgradable electronic module, the upgradable electronic module providing a greater number of a second type of external connection for a second type of electronic device than the number of first type of external connections to the first type of electronic devices supported by the internal component, the upgradable electronic module connection-compatible with the enhanced electronic module incorporating an electronic component that supports the greater number of the second type of external connections, the method comprising:

including in the computer system the upgradable electronic module;

including in the computer system a first number of electronic interconnections, each electronic interconnection connected to each of the first type and second type external connections provided by the upgradable electronic module and each of the electronic interconnections electrically compatible with first and second type devices coupled to the respective first and second type electronic connections through the electronic interconnections;

including in the upgradable electronic module a system controller having a first port adapted to support a first type external connection; and electronically connecting the first and second type external connections on the upgradable electronic module to the first port of the system controller.

12. The method of claim 11 wherein the first port of the system controller supports a single external connection to a peripheral component interconnect bus and the upgradable electronic module provides the first type external connections to a peripheral component interconnect bus and the second type external connections to an accelerated graphics processor bus.

13. The method of claim 11 further including connecting electronic devices that run at a clock speed of 33 megahertz to the peripheral component interconnect bus and connecting a VGA controller that selectively runs at either one of a clock speed of 33 megahertz and a clock speed of 66 megahertz to the accelerated graphics processor bus so that the upgradable electronic module exchanges data and control signals with the VGA controller at a clock speed of 33 megahertz, whereas the enhanced electronic module exchanges data and control signals with the VGA controller at a clock speed of 66 megahertz.

14. A method for implementing an upgradable electronic module for use in an electronic system, the electronic system having a first system component that is adapted to interface through a first bus with either a first port of an existing electronic module or a first port of a future electronic module, the existing electronic module containing a first module component having a first port coupled to the first port of the existing electronic module, and the future electronic module containing a first module component having a first port coupled to the first port of the future electronic module, the electronic system further having a second system component that is adapted to interface through a second bus with either the first port of the existing electronic module or a second port of the future electronic module that is coupled to a second port of the first module component in the future electronic module, the method comprising:

incorporating into the upgradable electronic module a module component having a first port;

incorporating into the upgradable electronic module a first port that is physically compatible with the first bus of the electronic system and electrically compatible with the first system component;

incorporating into the upgradable electronic module a second port that is physically compatible with the second bus of the electronic system and electrically compatible with the second system component; and coupling the first port of the module component to both the first port and the second port of the upgradable electronic module.

15. The method claim 14 wherein the first bus comprises a PCI bus, the second bus comprises an AGP bus, the first system component comprises a PCI compatible computer component, and the second system component comprises a video controller.

16. A method for implementing a computer system comprising:

incorporating into the computer system a PCI bus;

incorporating into the computer system a PCI compatible computer component coupled to the PCI bus;

incorporating into the computer system an AGP bus;

incorporating into the computer system a video controller coupled to the AGP bus;

incorporating into the computer system an upgradable electronic module comprising a processor and a system controller, the system controller having a processor port and a PCI port, the upgradable electronic module further comprising a first externally accessible port and a second externally accessible port;

coupling the processor port of the system controller to the processor;

coupling the PCI port of the system controller to the first externally accessible port;

coupling the first externally accessible port to the PCI bus;

coupling the PCI port of the system controller to the second externally accessible port;

coupling the second externally accessible port to the AGP bus; and the PCI compatible component adapted to interface through the PCI bus with either the first externally accessible port of the upgradable electronic module or a first externally accessible port of a future electronic module and the video controller adapted to interface through the AGP bus with either the second externally accessible port of the upgradable electronic module or a second externally accessible port of the future electronic module.

* * * * *